Aug. 31, 1926.
H. C. MAISE
DOOR FINISH STRIP BELT
Filed Dec. 27, 1922
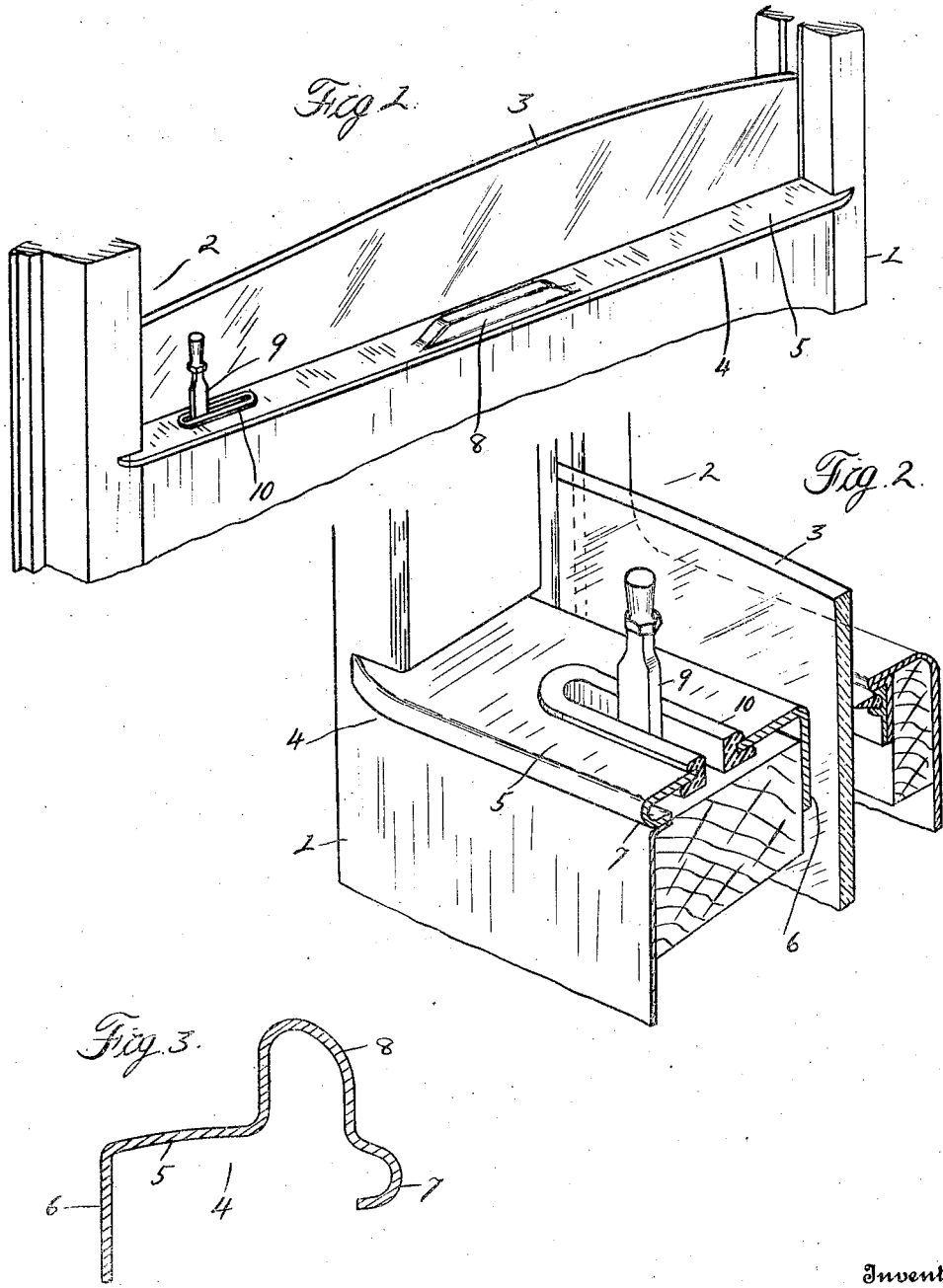
Inventor
Herman C. Maise Patented Aug. 31, 1926.

1,598,213

UNITED STATES PATENT OFFICE.

HERMAN C. MAISE, OF DETROIT, MICHIGAN, ASSIGNOR TO BRIGGS MANUFACTURING COMPANY, OF DETROIT, MICHIGAN, A CORPORATION OF MICHIGAN.

DOOR FINISH STRIP BELT.

Application filed December 27, 1922. Serial No. 609,205.

The invention relates to finish strip belts of motor vehicle body doors and has for one of its objects the provision of a simple construction of garnish molding or finish strip belt provided with an integral pull to handle portion for facilitating the opening and closing of the door. Another object of the invention is to provide an anti-rattling device upon the garnish molding for the lever of the door lock which extends through the garnish molding. Further objects of the invention reside in the novel combinations and arrangements of parts as more fully hereinafter set forth.

In the drawings:—

Figure 1 is a perspective view of a portion of a motor vehicle body door with a finish strip belt embodying my invention;

Figure 2 is a sectional perspective view thereof;

Figure 3 is a vertical section through the finish strip belt and showing the contour of the handle portion formed thereon.

1 is the door of a closed motor vehicle body having the window opening 2 therein which is adapted to be closed by the sashless glass panel 3 slidably mounted in the door. 4 is the garnish molding at the lower end of the window opening and inside the glass panel and having at the outer and inner edges of its main body portion 5 the depending flange 6 and the return bent flange 7 respectively.

To provide a simple and inexpensive means for facilitating the opening and closing of the door, the main body portion 5 of the garnish molding has formed or embossed therein the upwardly extending projection 8 forming an integral pull to handle portion upon the finish strip belt. The outer side of this embossed projection extends substantially vertical and is spaced inwardly from the glass panel a sufficient distance to permit of easy engagement by a person's hand.

9 is the door lock lever extending upwardly through the main body portion 5 of the garnish molding near the swinging edge of the door, and 10 is the anti-rattling device of substantially channel cross section and having the flanges of the channel at the lower and upper sides of the main body portion of the garnish molding and extending continuously around the edge of the elongated opening formed therein and through which the lever passes. This anti-rattling device is formed of a suitable yieldable material and consequently prevents rattling which might have been caused by the lever. Furthermore, the device may be readily applied to the edge of the elongated opening.

What I claim as my invention is:—

1. A garnish molding for vehicle doors and the like comprising a strip of metal having a substantially flat body portion provided intermediate its ends with an upstanding return bent portion constituting a pull to handle for a door.

2. A garnish molding for vehicle doors and the like comprising an inverted channel-shaped metal strip, the base of said channel being provided with an upwardly embossed inverted channel-shaped portion constituting a pull to handle for a door.

3. A garnish molding for vehicle doors and the like comprising a narrow strip of metal having an upstanding elongated embossed portion constituting a pull to handle, the side walls of said embossed portion being substantially parallel to each other and to the edges of said strip.

4. A garnish molding for vehicle doors and the like comprising a metal strip having an upstanding inverted channel-shaped embossed portion constituting a pull to handle, the base of said channel portion having inclined ends merging into the adjacent surface of said strip.

5. A garnish molding for vehicle doors and the like, comprising a metal strip having an upstanding inverted substantially channel-shaped embossed portion constituting a pull to handle, said channel portion extending longitudinally of said strip, one side of said channel portion being adjacent to one side edge of said strip, the other side wall of said channel being spaced a greater distance from the opposite edge of said strip.

6. In combination, a garnish molding for vehicle doors having an elongated slot therein for receiving a door lock handle and the like, and a channel-shaped strip having the base thereof extending along the edges of said opening and having the side walls thereof disposed upon opposite sides of said molding at the edges of said opening, said strip being formed of resilient material so that the base portion will serve as a cushion for a lock handle in the opening and will prevent such a handle from rattling.

7. An article of manufacture comprising a strip of metal constituting a garnish molding for vehicle doors and the like, said strip being provided intermediate its ends with an upstanding portion constituting a pull-to handle for a door and having at one end thereof an elongated slot for receiving a door lock handle and the like, and a strip of yieldable material extending about said slot so as to serve as a cushion for a lock handle in the opening and thereby prevent such a handle from rattling.

In testimony whereof I affix my signature.

HERMAN C. MAISE.